(12) United States Patent
Won (10) Patent No.: US 6,448,677 B1
(45) Date of Patent: *Sep. 10, 2002

(54) FLAT-TYPE VIBRATION MOTOR (75) Inventor: Sung-Hong Won, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/839,500

(22) Filed: Apr. 20, 2001

(51) Int. Cl.$^7$ .................................................. H02K 7/75
(52) U.S. Cl. ........................................................ 310/81
(58) Field of Search .......................... 310/81, 180, 184, 310/268, DIG. 6; H02K 7/75

(56) References Cited

U.S. PATENT DOCUMENTS

| | | | | |
|---|---|---|---|---|
| 5,036,239 A | * | 7/1991 | Yamaguchi | 310/268 |
| 5,175,459 A | * | 12/1992 | Daniel et al. | 310/81 |
| 5,793,133 A | * | 8/1998 | Shiraki et al | 310/81 |
| 6,265,838 B1 | * | 7/2001 | Won | 310/81 |

* cited by examiner

Primary Examiner—Nestor Ramirez
Assistant Examiner—Karen B Addison
(74) Attorney, Agent, or Firm—Darby & Darby

(57) ABSTRACT

A flat-type vibration motor comprising a lower casing part, an upper casing part for covering the lower casing part, a shaft for interconnecting the lower casing part and upper casing part at their centers, a lower board attached to an upper surface of the lower casing part, a magnet mounted on an edge of the upper surface of the lower casing part outside the lower board, the magnet being polarized with at least 2 poles, an upper board formed by cutting a disc at a certain angle and supporting the resulting disc by the shaft via a bearing such that it is eccentrically rotatable, a commutator arranged on a lower surface of the upper board and around an axis of the shaft, the commutator having segments of the number twice that of the poles of the magnet, a pair of brushes having their one ends fixedly connected to the lower board and their other ends brought into contact with the commutator, the brushes being spaced apart from each other at an interval of an electrical angle within the range of $\pi/2$ to $3\pi/2$, and a coil part having a pair of armature coil assemblies formed on an upper surface of the upper board, each of the armature coil assemblies including a pair of armature coils duplicately wound and connected in common to a neutral point.

4 Claims, 10 Drawing Sheets

FLAT-TYPE VIBRATION MOTOR

BACKGROUND OF THE INVENTION

1. Field of the Invention

The present invention relates in general to vibration motors contained in cellular phones or pagers to constitute call incoming notification means together with a bell unit, and more particularly to a flat-type vibration motor which can continuously be driven stably owing to the removal of a nonconduction phenomenon resulting from a mechanical error occurring when it is driven in a two-phase half-wave drive manner.

2. Description of the Prior Art

A call incoming notification function is one of the essential functions of general communication units.

That is, the call incoming notification function is necessary for notifying a user of a communication unit of a call or message incoming situation, thereby allowing the user to receive an incoming call or message. The generation of a sound such as a melody or bell and the vibration of communication units are most used to effect the call incoming notification function.

In other words, if a desired call incoming notification function is previously selected by a user, it is performed upon call incoming, so that the user can recognize the call incoming state.

Among such call incoming notification functions, a vibration function is often used in consideration of saving other persons from suffering from noise pollution in places where many people are crowded.

A sounding function, such as the generation of a melody or bell, is generally adapted to output a preset one of various melodies or bells in a communication unit externally through a small-scale speaker so that the user can recognize the call incoming state. The vibration function is generally adapted to drive a small-sized vibration motor so as to transfer a vibratory force to a casing of a communication unit, resulting in the unit body being vibrated.

Figure 1:
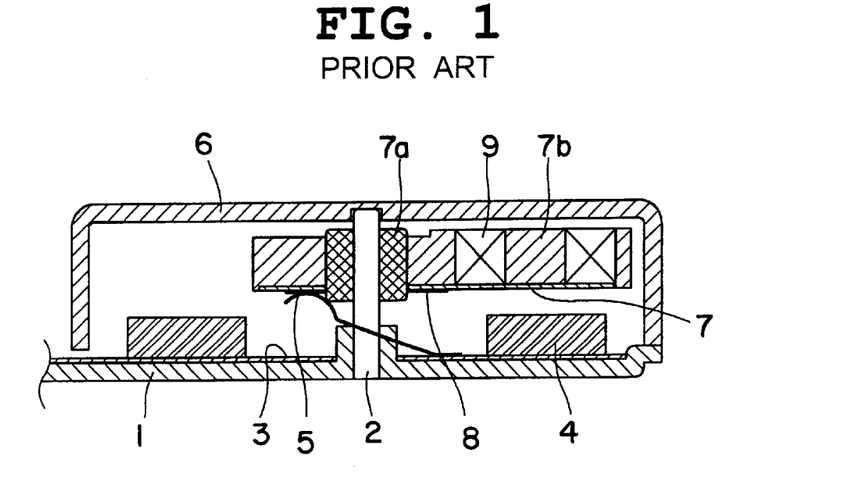
FIG. 1 is a vertical cross-sectional view of a conventional flat-type vibration motor.

This invention relates to a vibration motor for performing the vibration function among the above call incoming notification functions. FIG. 1 is a cross-sectional view of a flat-type vibration motor, which is a representative vibration motor.

With reference to FIG. 1, the flat-type vibration motor comprises a lower casing part 1 provided at its bottom, and a shaft 2 fixed at the center of the lower casing part 1. Attached to the upper surface of the lower casing part 1 is a lower board 3 on which is printed a circuit capable of inputting external power.

The lower board 3 is typically fitted in small grooves of the upper surface of the lower casing part 1. An annular magnet 4 is mounted on the edge of the upper surface of the lower casing part 1 such that it is alternately polarized with N and S poles at regular intervals in a circumferential direction. The magnet 4 has an internal space at its center, which has its upper and lower parts opened and a predetermined diameter.

A pair of brushes 5 are provided on portions of the lower board 3 within the central internal space of the magnet 4 such that they are spaced apart from each other at a predetermined angle. The brushes 5 have their one ends connected respectively to input and output terminals and their other ends positioned at higher portions than the top of the magnet 4.

An upper casing part 6 is coupled with the lower casing part 1 at its edge to cover it. The upper casing part 6 supports the upper end of the shaft 2 while the lower casing part 1 supports the lower end of the shaft 2.

The shaft 2 and lower board 3 supported by the lower casing part 1, the magnet 4, the brushes 5 and the upper casing part 6 constitute a stator of the vibration motor. On the other hand, an upper board 7, a commutator 8 and a coil 9 constitute a rotor which is rotatable around the stator.

The upper board 7 is a printed circuit board formed by cutting a disc at a certain angle and supporting the resulting disc by the shaft 2 via a bearing 7a such that it is eccentrically rotatable.

The commutator 8 is formed integrally with the lower surface of the upper board 7 on which a circuit is printed, and has a plurality of segments supported by the shaft 2 via the bearing 7a. The brushes 5 are connected to the lower board 3 at their lower ends and brought into contact with the segments of the commutator 8 at their upper ends to elastically support them.

The coil 9 is attached to the upper surface of the upper board 7 on which no circuit is printed. This coil 9 may be provided with one coil or two or more coils according to a driving system of the vibration motor, for example, a single-phase driving system, two-phase driving system or three-phase driving system. In particular, the coil 9 may have two or more coils regularly and angularly spaced apart from each other. In FIG. 1, the coil 9 is shown to have two coils.

An insulator 7b is formed integrally with the remaining portion of the upper surface of the upper board 7 to which the coils 9 are not attached. The insulator 7b acts to electrically isolate the coils 9 from each other and increase an eccentric load. This insulator 7b is formed together with the commutator 8 and coils 9 attached to the upper board 7, through an insert injection process, when the upper board 7 is manufactured.

Accordingly, if an external voltage is applied to the lower board 3, it is induced to the commutator 8 through the brush 5 connected to the lower board 3 at its lower end, and then supplied to the coils 9 through the circuit printed on the upper board 7. As a result, an electromagnetic force is generated due to an interaction between a magnetic flux generated by the coils 9 and a magnetic flux generated by the magnet 4, so as to eccentrically rotate the rotor.

Subsequently, an eccentric rotation force of the rotor induces a lateral pressure, which is then transferred to the lower casing part 1 and the upper casing part 6 through the shaft 2. Because the lower casing part 1 is fixedly attached to a predetermined portion of a communication unit, the lateral pressure transferred to the lower casing part 1 causes the body of the communication unit to be vibrated. As a result, a user of the communication unit can sense the vibration of the unit.

A variety of driving systems have recently been proposed, although a three-phase driving system is generally applied to most vibration motors for the generation of a vibratory force. For example, a two-phase or single-phase driving system with a simpler construction is often used.

However, the two-phase or single-phase driving system has a disadvantage in that it cannot continuously maintain a driving force of a vibration motor, resulting in an instability in the driving of the vibration motor, differently from the three-phase driving system.

Namely, in the single-phase driving system, while a rotor is driven by an interaction between a coil and a magnet, a death point where the driving force is lost occurs at the moment that the flow of current through the coil is reversed in direction and thus changed in polarity.

In order to overcome the above problem, a cogging generator is typically provided in the single-phase driving system to generate an appropriate cogging at the death point, so as to continuously smoothly drive the vibration motor. However, this cogging generator is so very fine in size that it cannot always be accurately located at the same position.

Hence, the use of a cogging generator may reduce the motor productivity. Furthermore, for mass motor production, fine location deviations may occur in cogging generators, resulting in the occurrence of torque deviations in respective motors.

On the other hand, in the two-phase driving system, upon application of power, current must be induced in at least one of the two-phase coils 9 provided on the upper board 7. To this end, the brushes 5 brought into contact with the commutator 8 must always maintain a spaced angle therebetween constant.

In other words, assuming that the number of segments of the commutator 8, depending on the number of poles of the magnet 4, is n, the brushes 5 must maintain therebetween an angle obtained by dividing 360° by n/2.

Figure 2:
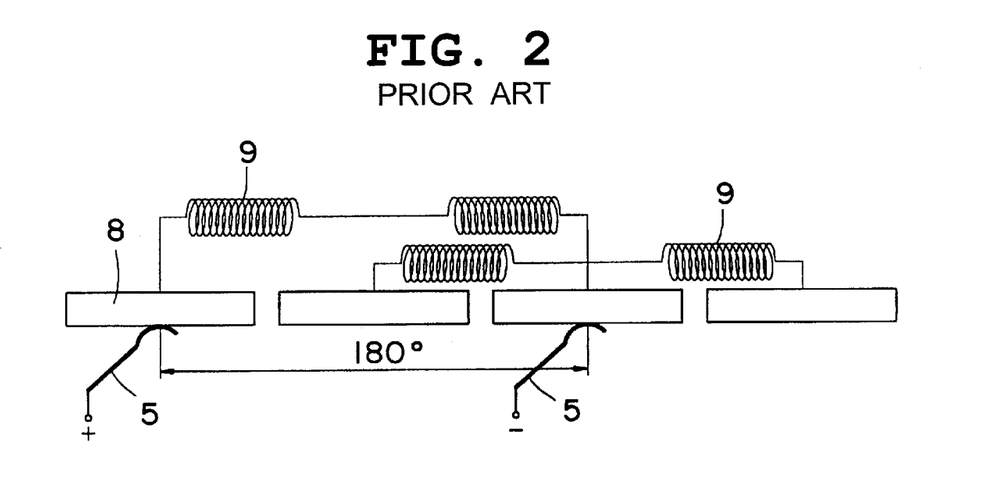
FIG. 2 is a circuit diagram showing connections among a commutator with four segments, brushes and coils in a conventional two-phase driven vibration motor.
Figure 3:
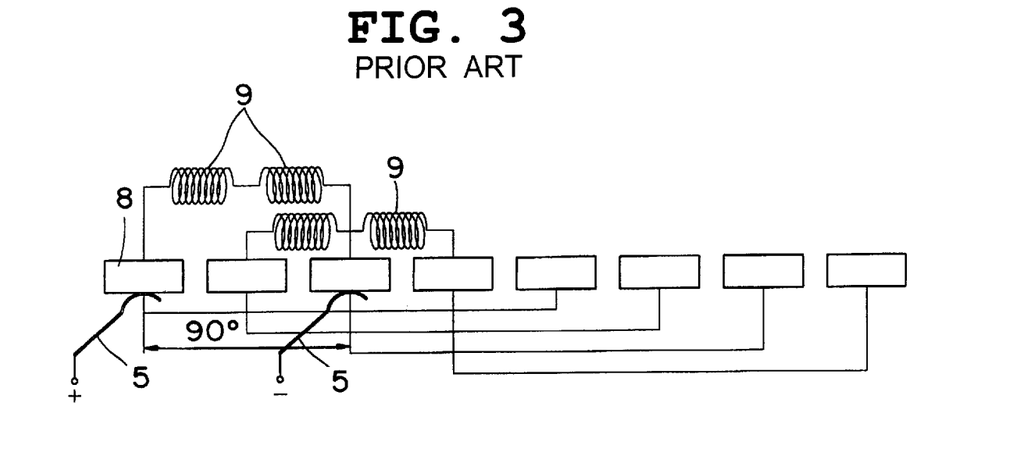
FIG. 3 is a circuit diagram showing connections among a commutator with eight segments, brushes and coils in a conventional two-phase driven vibration motor.
Figure 4:
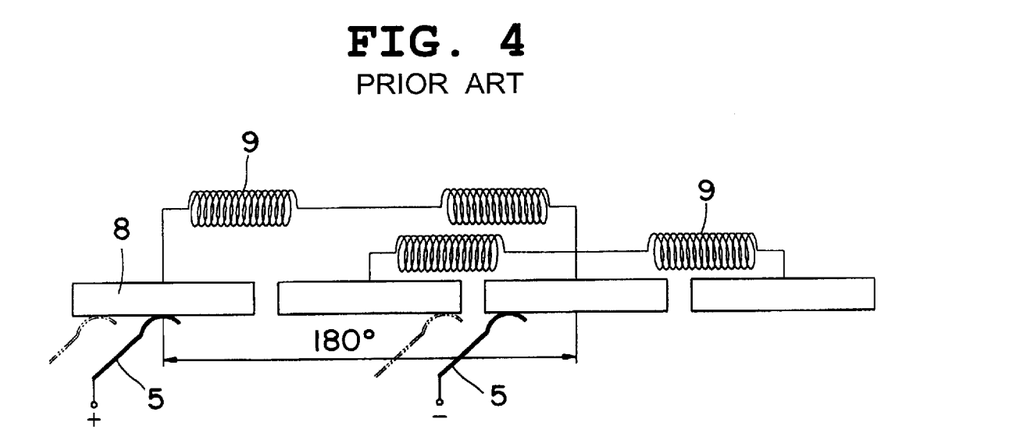
FIG. 4 is a circuit diagram showing connections among a commutator with four segments, brushes and coils in a conventional two-phase driven vibration motor when a spaced angle between the brushes is below 180°.
Figure 5:
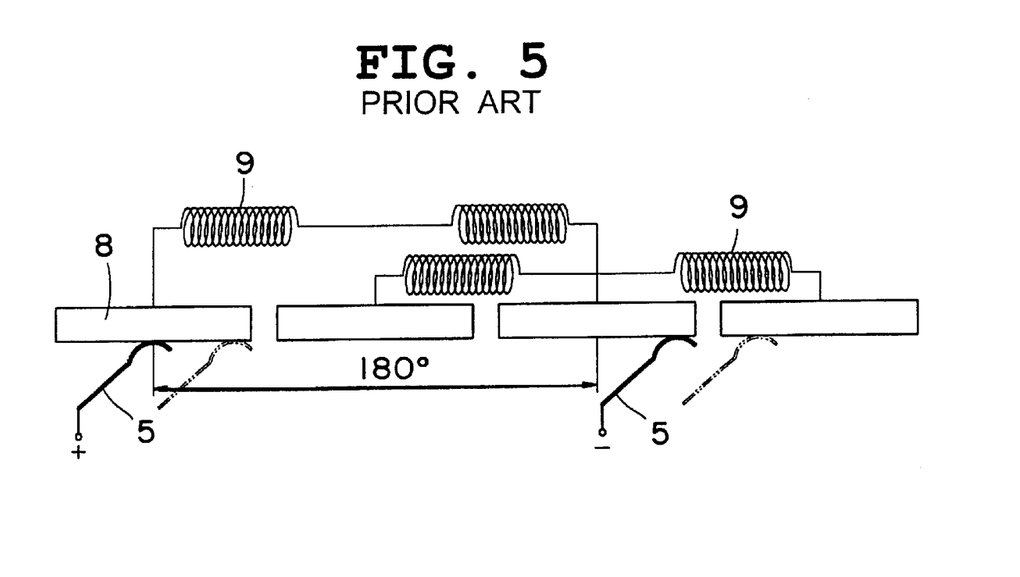
FIG. 5 is a circuit diagram showing connections among a commutator with four segments, brushes and coils in a conventional two-phase driven vibration motor when a spaced angle between the brushes is above 180°.

For example, the spaced angle between the brushes 5 must be 180° if the number of segments of the commutator 8 is 4, as shown in FIG. 2, and 90° if it is 8, as shown in FIG. 3.

In the case where the spaced angle between the brushes 5 is beyond a predetermined value, namely, it is smaller or higher than the predetermined value, the brushes 5 are connected respectively to the coils 9 with different phases, resulting in the occurrence of a nonconduction interval where no current flows to the coils 9.

Therefore, in the two-phase driving system, the spaced angle at which the brushes 5 are elastically brought into contact with the segments of the commutator 8 must accurately be maintained at a constant value depending on the number of the segments.

However, it is next to impossible to accurately form the brushes 5 at a certain angle therebetween during the actual motor manufacturing. This may cause a mechanical error to occur in the manufactured motor, which may in turn lead to the occurrence of a difference between drive performances of products and a large number of defective units for mass motor production.

SUMMARY OF THE INVENTION

Therefore, the present invention has been made in view of the above problems, and it is an object of the present invention to provide a flat-type vibration motor wherein four-phase coils are attached to an upper board and connected in common to a neutral point, thereby exhibiting both a two-phase half-wave drive character and a four-phase drive character, irrespective of a spaced angle between brushes, and assuring a drive stability.

It is another object of the present invention to provide a flat-type vibration motor wherein the margin of a spaced angle between brushes brought into contact with segments of a commutator is guaranteed to facilitate the manufacturing of the brushes so as to increase a working efficiency.

In accordance with the present invention, the above and other objects can be accomplished by the provision of a flat-type vibration motor comprising a lower casing part; an upper casing part for covering the lower casing part; a shaft for interconnecting the lower casing part and upper casing part at their centers; a lower board attached to an upper surface of the lower casing part; a magnet mounted on an edge of the upper surface of the lower casing part outside the lower board, the magnet being polarized with at least 2 poles; an upper board formed by cutting a disc at a certain angle and supporting the resulting disc by the shaft via a bearing such that it is eccentrically rotatable; a commutator arranged on a lower surface of the upper board and around an axis of the shaft, the commutator having segments of the number twice that of the poles of the magnet; a pair of brushes having their one ends fixedly connected to the lower board and their other ends brought into contact with the commutator, the brushes being spaced apart from each other at an interval of an electrical angle within the range of $\pi/2$ to $3\pi/2$; and coil means having a pair of armature coil assemblies formed on an upper surface of the upper board, which has the shape of the fan in a predetermined degree, each of the armature coil assemblies including a pair of armature coils duplicately wound and connected in common to a neutral point, the armature coils of the armature coil assemblies being sequentially conducted to have an electrical phase difference of $\pi/2$ in the order of their conduction.

Preferably, each of the armature coils of the coil means may have a pitch of an electrical angle of $\pi$.

As an alternative, each of the armature coils of the coil means may have a pitch of an electrical angle of $\pi/2$.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 6:
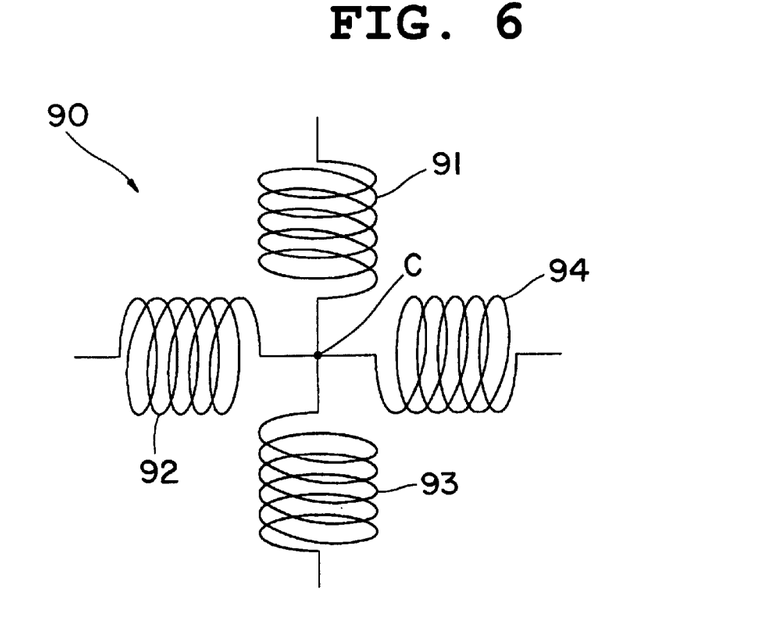
FIG. 6 is a view showing wound states of coils in accordance with the present invention.

The present invention provides a flat-type vibration motor comprising a coil part 90 attached to the upper surface of an upper board 70 and having four armature coils 91, 92, 93 and 94 with different phases, as shown in FIG. 6. The armature coils 91, 92, 93 and 94 are connected in common to a neutral point C to have both a two-phase drive character and a four-phase drive character.

Figure 7:
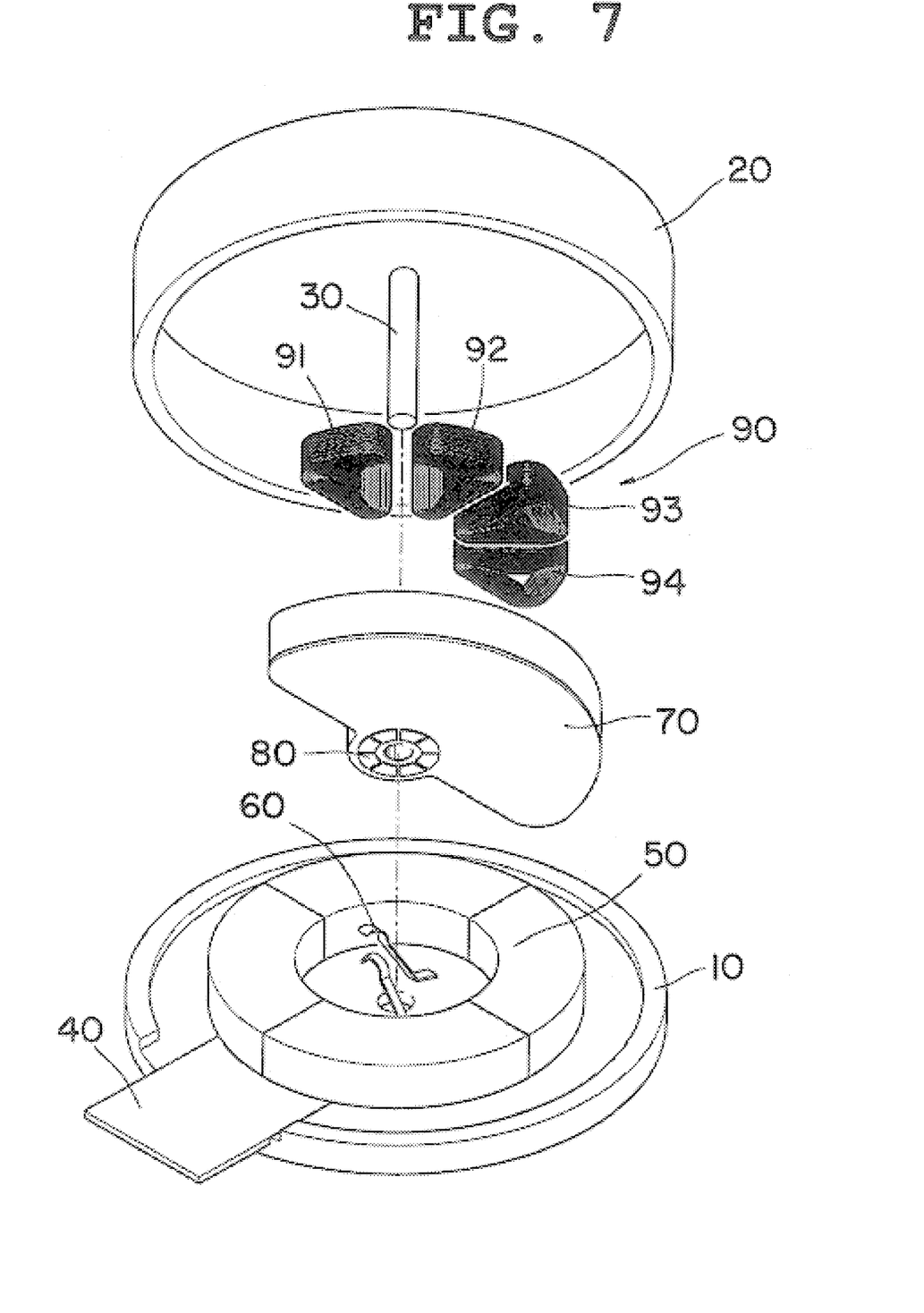
FIG. 7 is an exploded perspective view of a flat-type vibration motor in accordance with the present invention.

With reference to FIG. 7, the flat-type vibration motor comprises a stator including a lower casing part 10, an upper casing part 20, a shaft 30, a lower board 40, a magnet 50 and a pair of brushes 60, and a rotor including the upper board 70 eccentrically supported by a bearing, a commutator 80 and the coil part 90.

The upper casing part 20 is coupled with the lower casing part 10 to cover it. The lower casing part 10 and the upper casing part 20 are connected to each other at their centers via the shaft 30 such that their coupling can be kept solid.

Fitted in the central portion of the upper surface of the lower casing part 10 is the lower board 40 on which is printed a circuit capable of inputting external power. The circular magnet 50 is mounted on the edge of the upper surface of the lower casing part 10 outside the lower board 40.

The magnet 50 is alternately polarized with N and S poles at regular intervals in a circumferential direction. The number of poles of the magnet 50 is preferably 2n, or 2, 4, 6, . . . , . More preferably, the magnet 50 has two to six poles in consideration of an increase and decrease in the number of components in the vibration motor depending on the number of its poles.

The lower casing part 10 and the upper casing part 20 are connected to each other at their centers via the shaft 30, which rotatably supports the upper board 70. This board 70 is formed by cutting a disc at a certain angle.

The upper board 70 is a printed circuit board having a circuit printed on its lower surface. This board 70 is a member eccentrically driven upon its rotation because it is in an unbalanced state where its gravity center leans toward one side.

Provided on the lower surface of the upper board 70 is the commutator 80, which has a plurality of segments arranged around the axis of the shaft 30. The number of the segments of the commutator 80 is typically twice that of poles of the magnet 50.

The brushes 60 are provided between the lower board 40 and the commutator 80. These brushes 60 have their one ends electrically and fixedly connected to the lower board 40 and their other ends movably brought into contact with the commutator 80 on the upper board 70.

The brushes 60 are spaced apart from each other at a predetermined angle, which is an electrical angle within the range of π/2 to 3π/2.

One of the brushes 60 is adapted to perform a power input function for transferring power, induced through the lower board 40, to the commutator 80, and the other is adapted to perform a power output function for transferring power, induced in the commutator 80, to the lower board 40.

The above-stated construction of the present vibration motor is the same as the constructions of conventional vibration motors, with the exception that the coil part 90 is provided on a portion of the upper surface of the upper board 70, corresponding to the portion of the lower surface of the upper board 70 on which the commutator 80 is provided, connected to the circuit printed on the lower surface of the upper board 70 and has four armature coils with the same electrical phase difference, for example, a coil A 91, a coil B 92, a coil C 93 and a coil D 94 in FIG. 7.

The coil A 91, coil B 92, coil C 93 and coil D 94 of the coil part 90 are arranged in order of power input by contacts between the brushes 60 and the commutator 80. These armature coils are connected to the printed circuit of the upper board 70 at their one ends and in common to the neutral point C at their other ends.

The most remarkable feature of the present invention is that the armature coils on the upper board 70 have an electrical phase difference of π/2 with respect to the adjacent coils sequentially in order of their conduction.

In other words, the coil B 92 and coil D 94 have an electrical phase difference of π/2 with respect to the coil A 91, the coil A 91 and coil C 93 have an electrical phase difference of π/2 with respect to the coil B 92, the coil B 92 and coil D 94 have an electrical phase difference of π/2 with respect to the coil C 93, and the coil C 93 and coil A 91 have an electrical phase difference of π/2 with respect to the coil D 94.

In order to have the electrical phase difference in the above manner, the armature coils are arranged on the upper board 70 in various ways as in embodiments which will hereinafter be described.

Figure 8:
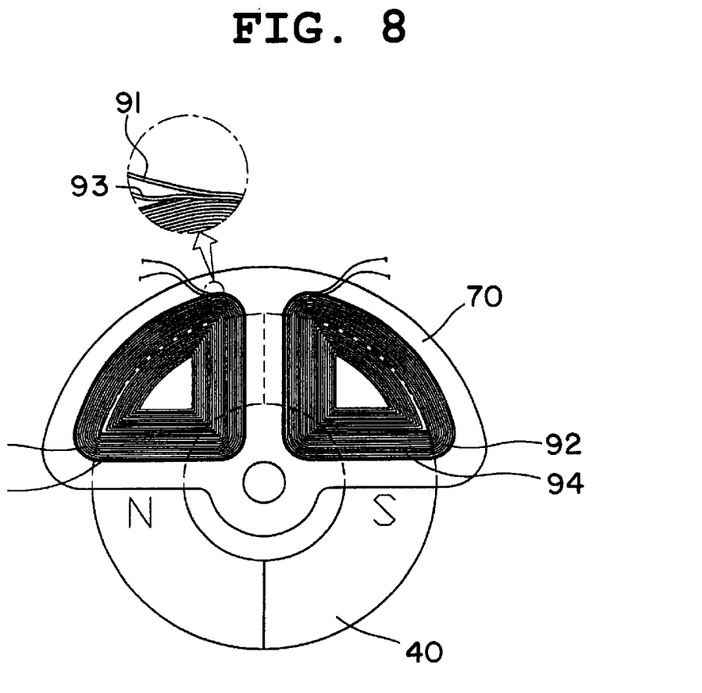
FIG. 8 is a view showing the arrangement of coils when a magnet of the present invention is of a two-pole type.

FIG. 8 is a view showing the arrangement of the coils when the magnet 50 is of a two-pole type.

Each of the armature coils has a pitch of an electrical angle of π/2. The armature coils wound in the same direction are arranged on the same plane of the upper board 70 while being spaced apart from each other by a width corresponding to an electrical angle of π/2. The other armature coils are duplicately wound around the previously arranged coils in the opposite direction to their wound direction, respectively.

Each of the duplicately wound armature coil pairs is typically coated with polyethylene or a similar nonconductive material.

Each of the duplicately wound armature coil pairs is coated up to a thickness which may be different according to an insulating voltage. Preferably, each coil pair is thinly coated to such a thickness as 1/10 or 1/100 of the diameter of each coil.

The duplicately wound armature coil pairs, coated in the above manner, can be kept wound by heating them up to a predetermined temperature.

Consequently, provided on the upper board 70 are a pair of coil assemblies, each including two coils wound in opposite directions. These coil assemblies are spaced apart from each other by a width corresponding to an electrical angle of π/2, to have an electrical phase difference corresponding to the spaced width.

For example, as shown in FIG. 8, the coil A 91 is arranged on a certain portion of the upper board 70, and the coil B 92, wound in the same direction as the coil A 91, is arranged on a position spaced apart from the coil A 91 at an electrical angle of π/2.

Then, the coil C 93 is duplicately wound around the coil A 91 in the opposite direction to its wound direction, and the coil D 94 is duplicately wound around the coil B 92 in the opposite direction to its wound direction.

Accordingly, the coil A 91 and the coil B 92 are spaced apart from each other at an interval of the electrical angle of π/2, and the coil C 93 and the coil D 94 are duplicately wound around the coil A 91 and the coil B 92, respectively. As a result, electrical signal periods between the coil A 91 and the coil B 92, between the coil B 92 and the coil C 93, between the coil C 93 and the coil D 94 and between the coil D 94 and the coil A 91 have a phase difference of π/2 equal to the spaced interval, respectively.

The above-stated construction of the coil part 90 wherein a pair of coil assemblies, each including two coils wound in the opposite directions, have an electrical phase difference of π/2 with respect to each other is similarly applicable to the case where the magnet 50 is of a four-pole type.

Exceptionally, in the case where the magnet 50 is of the four-pole type, each of the armature coils has a pitch of an electrical angle of either π or π/2.

In the case where the magnet 50 is of the four-pole type and the coil pitch is π, each of the armature coils has the same mechanical angle as the electrical angle of π/2 in the case where the magnet 50 is of the two-pole type.

Figure 9:
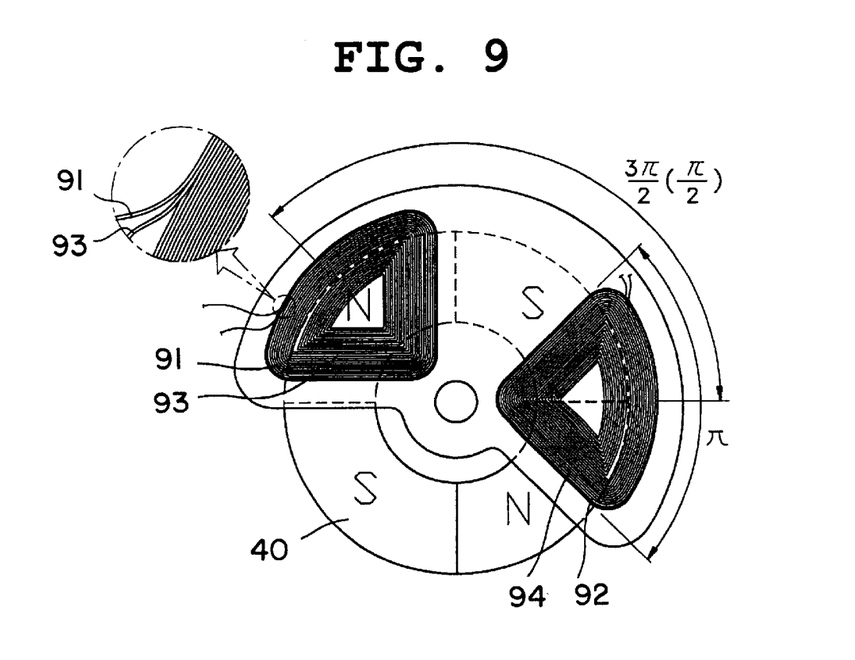
FIG. 9 is a view showing the arrangement of coils when the magnet of the present invention is of a four-pole type.

That is, as shown in FIG. 9, if the coil pitch is an electrical angle of π, it is impossible to space a pair of coil assemblies apart from each other at an interval of an electrical angle of π/2 as in the case where the magnet 50 is of the two-pole type.

In other words, in the case where the magnet 50 is of the four-pole type, the coil assemblies with a coil pitch of an electrical angle of π overlap each other if they are merely spaced apart from each other at an interval of an electrical angle of π/2.

The overlap of the coil assemblies causes the coil part 90 to be excessively broadened in width, which is not allowable due to a spatial limitation of the motor.

Hence, it is most preferable that the coil assemblies of the coil part 90 are spaced apart from each other at an interval of an electrical angle of 3π/2 having the same electrical characteristic as π/2, as shown in the above drawing.

In more detail, an electrical characteristic based on the situation that two coils have an electrical phase difference of π/2 in the forward direction is the same as that based on the situation that two coils have an electrical phase difference of π/2 in the reverse direction. These positions having an electrical phase difference of π/2 in the reverse direction are the same as those having an electrical phase difference of 3π/2 in the forward direction in a four-pole construction.

For example, assuming that the entire electrical phase angle is 2π, a coil at a position with a phase angle of 3π/2 has an electrical phase difference of π/2 with respect to a coil at a position with a phase angle of 0° along the rotation direction of the upper board 70 on which the coil part 90 is arranged. Similarly, a coil at a position with a phase angle of 0° has an electrical phase difference of π/2 with respect to a coil at a position with a phase angle of 3π/2 against the rotation direction of the upper board 70.

In other words, the phase angle may be either 3π/2 or π/2 according to which one of the two coils is referenced. In the present embodiment, the phase angle is set to 3π/2 such that the inter-coil electrical phase difference is π/2.

Therefore, according to the present embodiment, in the case where the pitch of each coil of the coil part 90 has a large electrical angle of π, a pair of coil assemblies, each including two coils duplicately wound, are spaced apart from each other at an interval of an electrical phase angle of 3π/2 such that they can be arranged on the same plane of the upper board 70, thereby overcoming a spatial limitation in the formation of the coil part 90 in the motor.

On the other hand, in the case where the magnet 50 is of the four-pole type, each of the four coils with different phases may have a reduced pitch such that they can be arranged on the same plane of the upper board 70.

In this case, all the four coils are wound in the same direction.

In the present invention, the four armature coils are arranged to have an electrical phase difference of π/2 in the rotation direction of the upper board 70, and the spaced angle between the brushes 60 for connection between the lower board 40 and the segments of the commutator 80 are set to within the range of π/2 to 3π/2 both in the case where the magnet 50 is of the two-pole type and in the case where it is of the four-pole type, as will hereinafter be described in detail.

In either case, the spaced angle between the brushes 60 are limited to the range of π/2 to 3π/2.

Figure 10:
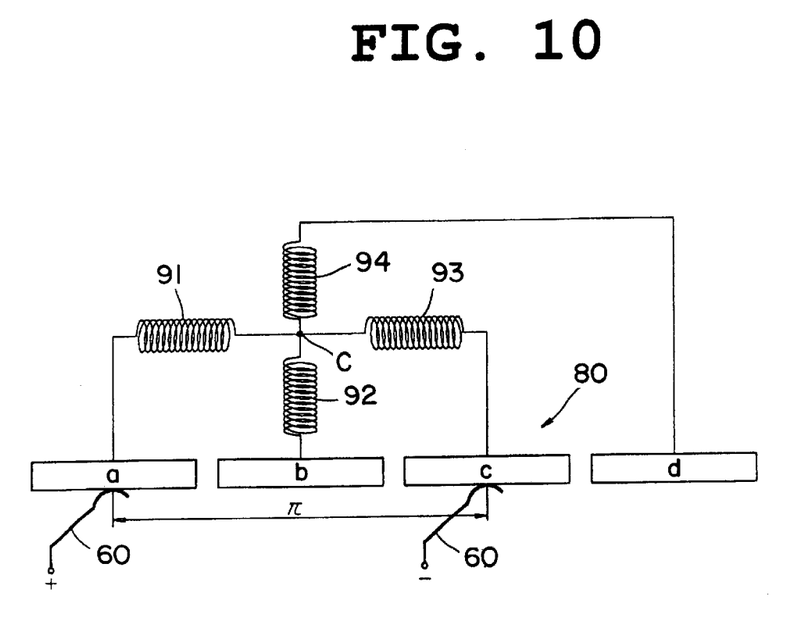
FIG. 10 is a circuit diagram showing connections among brushes, a commutator and coils in accordance with the present invention.

FIG. 10 schematically shows a circuit wherein the magnet 50 is of the two-pole type and the spaced angle between the brushes 60 brought into contact with the commutator 80 is an electrical angle within the range of π/2 to 3π/2 (a mechanical angle within the range of 90° to 270°). As shown in this drawing, the four armature coils, or the coil A 91, coil B 92, coil C 93 and coil D 94, are electrically connected respectively to a segment a, segment b, segment c and segment d of the commutator 80 at their one ends and in common to the neutral point C at their other ends.

Figure 11:
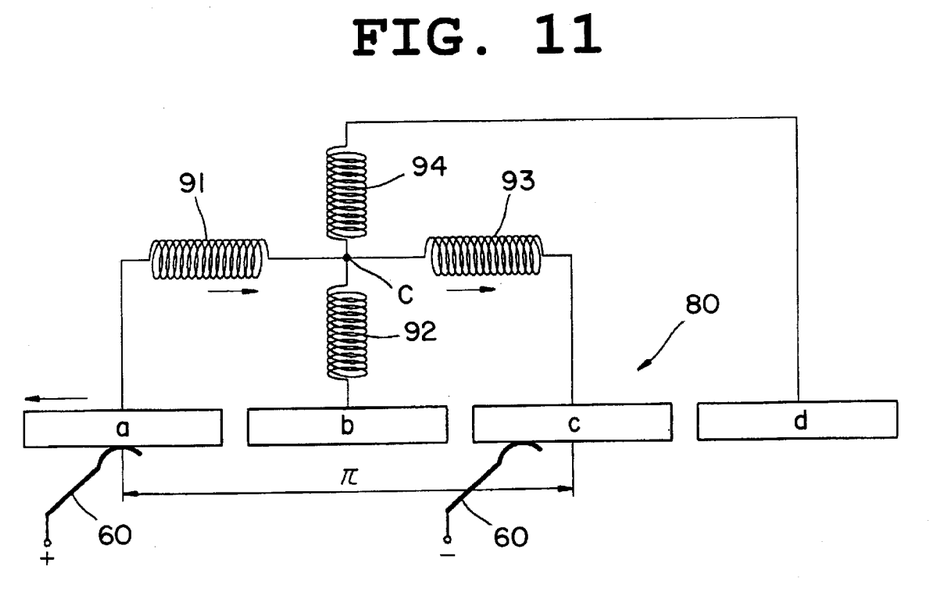
FIG. 11 is a circuit diagram showing connections among the brushes, commutator and coils when the magnet of the present invention is of the two-pole type and a spaced angle between the brushes is greater than $\pi/2$ and smaller than $\pi$.

In the above connection structure, the spaced angle between the brushes 60 may be an electrical angle greater than π/2 and smaller than π, as shown in FIG. 11. The following table 1 shows contact relations between the brushes 60 and the segments of the commutator 80 with the rotation of the upper board 70.

TABLE 1

|        | INPUT BRUSH | OUTPUT BRUSH |
|--------|-------------|--------------|
| STEP 1 | a           | b            |
| STEP 2 | a           | c            |
| STEP 3 | b           | c            |
| STEP 4 | b           | d            |
| STEP 5 | c           | d            |
| STEP 6 | c           | a            |
| STEP 7 | d           | a            |
| STEP 8 | d           | b            |

As seen from the above table 1, in the case where the magnet 50 is of the two-pole type, the input and output brushes 60 are continuously conducted through the segments of the commutator 80 brought into contact therewith and the coils.

Namely, if the input brush 60 is accurately brought into contact with the segment a of the commutator 80 as shown in FIG. 11, the output brush 60 is brought into contact with the segment b or c of the commutator 80 or both of them.

As a result, even when power is inputted through one segment, it is outputted through one or two segments after being passed through the neutral point C, thereby making the coil part 90 conductive. Subsequently, a driving force is induced owing to an interaction between the coil part 90 and the magnet 50 to rotate the upper board 70 about the shaft 30.

Alternatively, if the input brush 60 is brought into contact with two segments at one time, the output brush 60 is brought into contact with only one segment, thereby causing current to flow sequentially through two segments, two coils, the neutral point C, one coil, one segment and the output brush 60.

In other words, in most cases, as shown in FIG. 11, current flows sequentially through one segment, one coil, the neutral point C, one coil and one segment, thereby making the coil part 90 conductive. But, in the case where any one of the brushes 60 is brought into contact with two segments at one time, current is inputted or outputted through those segments to make the coil part 90 conductive, thereby causing the coil part to be continuously kept conductive. Under the condition that the coil part 90 is kept conductive, a driving force is induced owing to an interaction between the coil part 90 and the magnet 50 so as to rotate the upper board 70.

Figure 12:
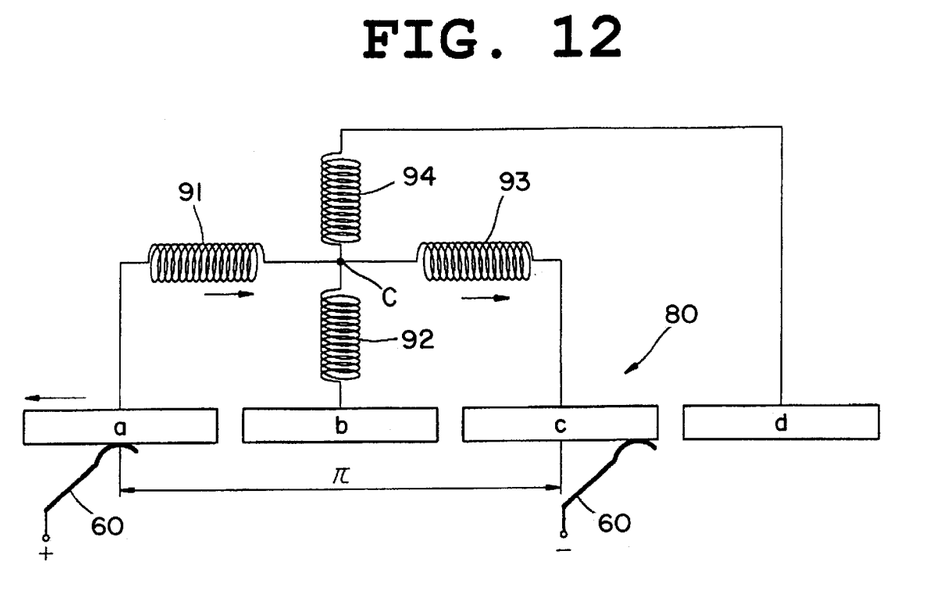
FIG. 12 is a circuit diagram showing connections among the brushes, commutator and coils when the magnet of the present invention is of the two-pole type and the spaced angle between the brushes is greater than n and smaller than $3\pi/2$.

FIG. 12 schematically shows a circuit wherein the magnet 50 is of the two-pole type and the spaced angle between the brushes 60 brought into contact with the commutator 80 is an electrical angle within the range of $\pi$ to $3\pi/2$ (a mechanical angle within the range of 180° to 270°). The below table 2 shows contact relations between the brushes 60 and the segments of the commutator 80 with the rotation of the upper board 70.

TABLE 2

|  | INPUT BRUSH | OUTPUT BRUSH |
| --- | --- | --- |
| STEP 1 | a | c |
| STEP 2 | a | d |
| STEP 3 | b | d |
| STEP 4 | b | a |
| STEP 5 | c | a |
| STEP 6 | c | b |
| STEP 7 | d | b |
| STEP 8 | d | c |

As seen from the above table 2, the circuit wherein the magnet 50 is of the two-pole type and the spaced angle between the brushes 60 is an electrical angle within the range of $\pi$ to $3\pi/2$ is operated in a similar manner to the circuit of FIG. 11 to continuously keep the coil part 90 conductive.

That is, if the input brush 60 is accurately brought into contact with one segment, for example, the segment a of the commutator 80 as shown in FIG. 12, the output brush 60 is brought into contact with the segment c or d of the commutator 80 or both of them.

Alternatively, in the case where the input brush 60 is brought into contact with two segments at one time, the output brush 60 is necessarily brought into contact with only one segment.

As a result, current flows smoothly through the coil part 90 regardless of the rotation angle of the upper board 70, thereby causing a driving force to be induced owing to an interaction between the coil part 90 and the magnet 50 to rotate the upper board 70 continuously.

Figure 13:
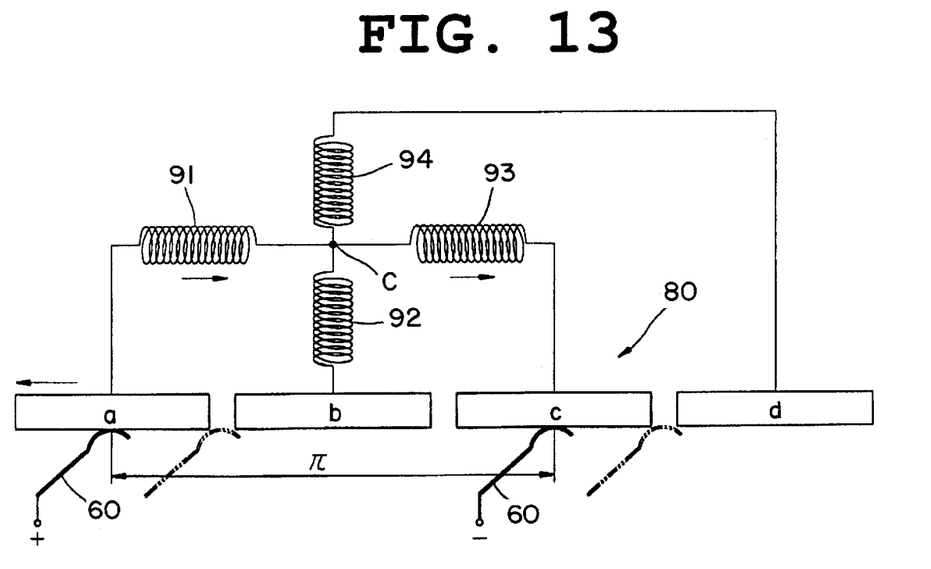
FIG. 13 is a circuit diagram showing connections among the brushes, commutator and coils when the magnet of the present invention is of the two-pole type and the spaced angle between the brushes is π.

On the other hand, in the case where the spaced angle between the brushes 60 brought into contact with the segments of the commutator 80 is an electrical angle of $\pi$ (a mechanical angle of 180°) as shown in FIG. 13, each of the brushes 60 is brought into contact with only one segment or two segments at one time.

In the case where each of the input and output brushes 60 is brought into contact with only one segment, each armature coil outputs a signal with an electrical phase angle of $\pi/2$ with the rotation of the upper board 70. Alternatively, in the case where each of the input and output brushes 60 is brought into contact with two adjacent segments of the commutator 80 at one time as indicated by a one-dot chain line in FIG. 13, current flows through the four armature coils of the coil part 90 at the same time.

As seen from the above description, a four-phase drive characteristic is exhibited if each of the input and output brushes 60 is brought into contact with only one segment, and a two-phase drive characteristic is exhibited if each of the input and output brushes 60 is brought into contact with two segments at one time.

Provided that the four armature coils are arranged on the upper board 70 to have an electrical phase difference of $\pi/2$ under the condition that the magnet 50 is of the two-pole type, current is always induced in the coil part 90 to generate a driving force continuously. This arrangement also provides a considerable margin to the spaced angle between the brushes 60, thereby making it easy to manufacture the brushes 60.

Figure 14:
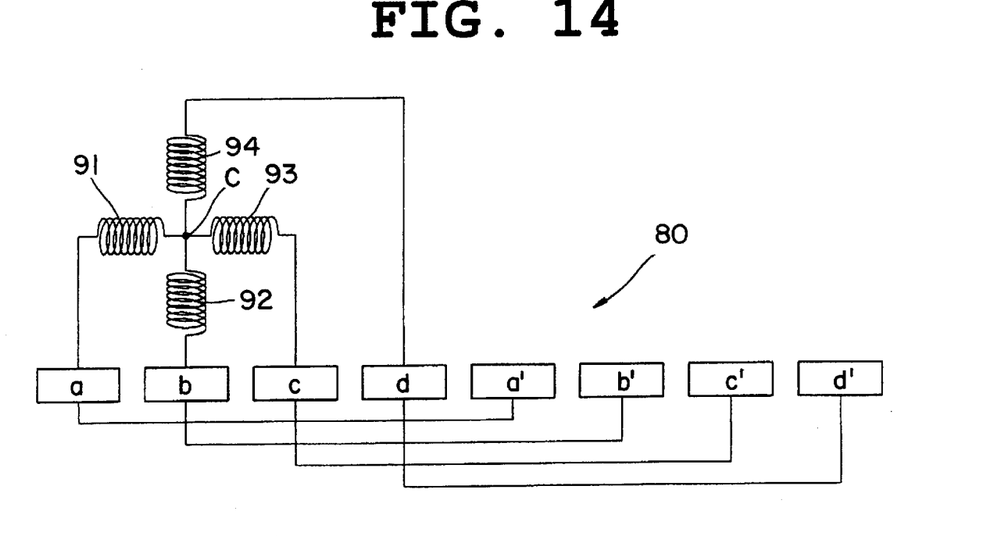
FIG. 14 is a circuit diagram showing connections among segments of the commutator when the magnet of the present invention is of the four-pole type.

FIG. 14 shows connections between the segments of the commutator 80 and the coil part 90 under the condition that the magnet 50 is of the four-pole type.

If the magnet 50 is of the four-pole type, the number of segments of the commutator 80 is typically eight, which is twice that of poles of the magnet 50. Four of the segments in the rotation direction are electrically connected sequentially to the four armature coils, which are in turn connected in common to the neutral point C.

The other four segments, not directly connected to the mature coils, are electrically connected respectively to the segments connected directly to the armature coils. As a result, the actual arrangement of the segments is similar to that when the magnet 50 is of the two-pole type.

In the case where the segments of the commutator 80 are eight in number as stated above, the spaced angle between the brushes 60 is an electrical angle within the range of $\pi/2$ to $\pi/2$ (a mechanical angle within the range of 90° to 270°), similarly to the above-described embodiments.

Similarly to the above description about the construction wherein the magnet 50 is of the two-pole type, a description will hereinafter be given separately of the case where the spaced angle between the brushes 60 brought into contact with the commutator 80 is an electrical angle within the range of $\pi/2$ to $\pi$ and the case where it is an electrical angle within the range of $\pi$ to $3\pi/2$.

Figure 15:
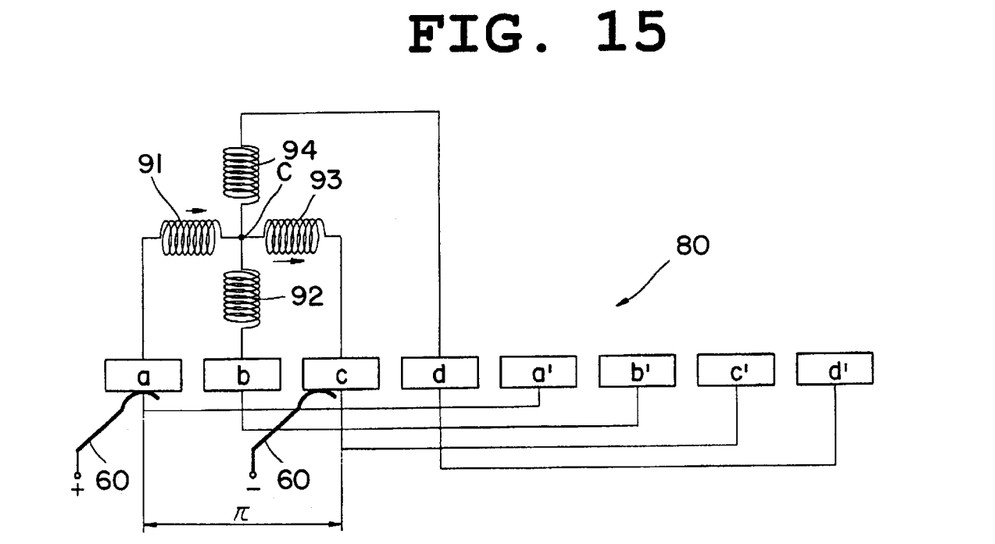
FIG. 15 is a circuit diagram showing connections among the brushes, commutator and coils when the magnet of the present invention is of the four-pole type and the spaced angle between the brushes is greater than π/2 and smaller than π.

FIG. 15 is a circuit diagram showing an embodiment wherein the magnet 50 is of the four-pole type and the spaced angle between the brushes 60 brought into contact with the segments of the commutator 80 is an electrical angle within the range of $\pi/2$ to $\pi$ (a mechanical angle within the range of 45° to 90°). The below table 3 shows contact relations between the brushes 60 and the segments of the commutator 80 with the rotation of the upper board 70.

TABLE 3

|  | INPUT BRUSH | OUTPUT BRUSH |
|---|---|---|
| STEP 1 | a | b |
| STEP 2 | a | c |
| STEP 3 | b | c |
| STEP 4 | b | d |
| STEP 5 | c | d |
| STEP 6 | c | a' |
| STEP 7 | d | a' |
| STEP 8 | d | b' |
| STEP 9 | a' | b' |
| STEP 10 | a' | c' |
| STEP 11 | b' | c' |
| STEP 12 | b' | d' |
| STEP 13 | c' | d' |
| STEP 14 | c' | a |
| STEP 15 | d' | a |
| STEP 16 | d' | b |

As seen from the above table 3, when the spaced angle between the brushes 60 is an electrical angle within the range of $\pi/2$ to $\pi$, the connection relations between the brushes 60 and the four segments, or the segment a, segment b, segment c and segment d, are almost the same as those in the table 1.

Exceptionally, in this embodiment, the segment a', segment b', segment c' and segment d' are arranged subsequently to the segment a, segment b, segment c and segment d. However, because the segment a', segment b', segment c' and segment d' are electrically connected respectively to the segment a, segment b, segment c and segment d, current is first induced to the coil part 90 through the segment a, segment b, segment c and segment d when the brushes 60 are brought into contact with the segment a', segment b', segment c' and segment d'. This operation is the same as that when the brushes 60 are brought into direct contact with the segment a, segment b, segment c and segment d.

In other words, the point of difference from the table 1 is that the brushes 60 are sequentially brought into contact with the segment a, segment b, segment c, segment d, segment a', segment b', segment c' and segment d' and current inputted or outputted through the brush 60 brought into contact with the segment a', segment b', segment c' and segment d' is necessarily inputted or outputted through the segment a, segment b, segment c and segment d.

Accordingly, even in the case where the magnet 50 is of the four-pole type and the segments of the commutator 80 are eight in number, current always flows to the coil part 90 on the upper board 70, thereby causing a driving force to be continuously generated owing to an interaction between the coil part 90 and the magnet 50.

Figure 16:
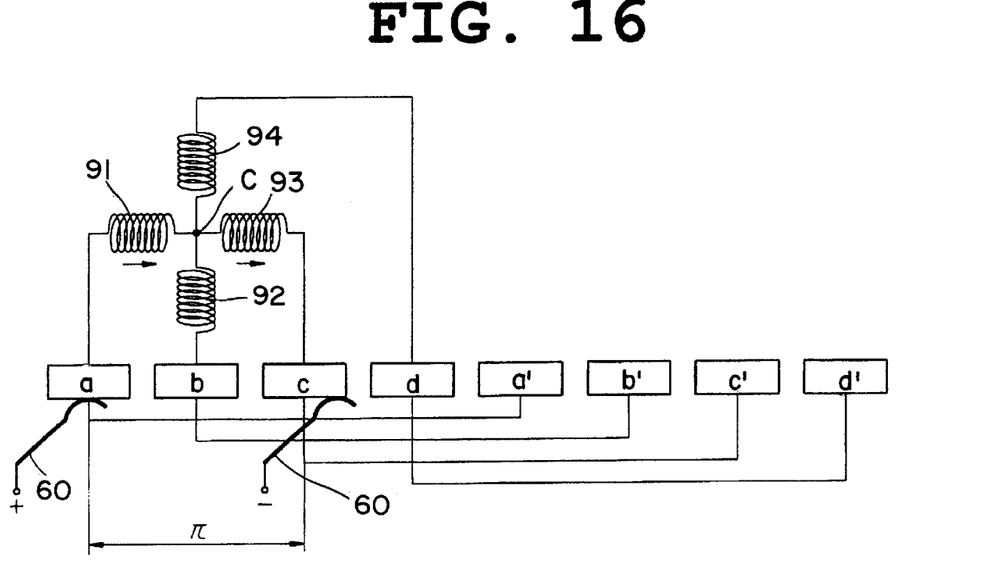
FIG. 16 is a circuit diagram showing connections among the brushes, commutator and coils when the magnet of the present invention is of the four-pole type and the spaced angle between the brushes is greater than π and smaller than 3π/2.

FIG. 16 is a circuit diagram showing an embodiment wherein the magnet 50 is of the four-pole type and the spaced angle between the brushes 60 brought into contact with the segments of the commutator 80 is an electrical angle within the range of $\pi$ to $3\pi/2$ (a mechanical angle within the range of 90° to 180°). The below table 4 shows contact relations between the brushes 60 and the segments of the commutator 80 with the rotation of the upper board 70.

TABLE 43

|  | INPUT BRUSH | OUTPUT BRUSH |
|---|---|---|
| STEP 1 | a | c |
| STEP 2 | a | d |
| STEP 3 | b | d |
| STEP 4 | b | a' |
| STEP 5 | c | a' |
| STEP 6 | c | b' |
| STEP 7 | d | b' |
| STEP 8 | d | c' |
| STEP 9 | a' | c' |
| STEP 10 | a' | d' |
| STEP 11 | b' | d' |
| STEP 12 | b' | a |
| STEP 13 | c' | a |
| STEP 14 | c' | b |
| STEP 15 | d' | b |
| STEP 16 | d' | c |

As seen from the above table 4, when the spaced angle between the brushes 60 is an electrical angle within the range of $\pi$ to $3\pi/2$, the connection relations between the brushes 60 and the four segments, or the segment a, segment b, segment c and segment d, are almost the same as those in the table 2.

Exceptionally, in this embodiment, the commutator 80 has eight segments, or the segment a, segment b, segment c and segment d and the segment a', segment b', segment c ' and segment d' arranged subsequently thereto. However, because the segment a', segment b', segment c' and segment d' are electrically connected respectively to the segment a, segment b, segment c and segment d, current is first induced to the coil part 90 through the segment a, segment b, segment c and segment d when the brushes 60 are brought into contact with the segment a', segment b', segment c' and segment d'. This operation is the same as that when the brushes 60 are brought into direct contact with the segment a, segment b, segment c and segment d.

Namely, in the case where the segments of the commutator 80 are arranged in the order of the segment a, segment b, segment c, segment d, segment a', segment b', segment c' and segment d' in the rotation direction of the upper board 70 and the brushes 60 are brought into contact with the commutator 80 while being spaced apart from each other at an interval of an electrical angle within the range of $\pi$ to $3\pi/2$, the brushes 60 are connected respectively to at least two armature coils of the coil part 90, or the input armature coil and the output armature coil, to keep them conductive. As a result, the present motor can be continuously driven in a two-phase drive manner.

On the other hand, in the case where the spaced angle between the brushes 60 brought into contact with the commutator 80 is an electrical angle of $\pi$, a two-phase drive characteristic is exhibited in most driven states. But, if each of the brushes 60 is brought into contact with two segments at one time, current flows through the four armature coils of the coil part 90 at the same time, resulting in the exhibition of a four-phase drive characteristic.

Through the above-stated embodiments, the four coils of the coil part 90 are sequentially arranged on the rotating member, or the upper board 70, at regular electrical angles and connected in common to the neutral point C. In the case where the spaced angle between the brushes 60 is the electrical angle of $\pi$, the two-phase drive characteristic is exhibited together with the intermittent four-phase drive characteristic. Alternatively, in the case where the spaced angle between the brushes 60 is an electrical angle within the range of $\pi/2$ to $\pi$ or of $\pi$ to $3\pi/2$, only the two-phase drive characteristic is exhibited to generate a driving force stably.

Figure 17:
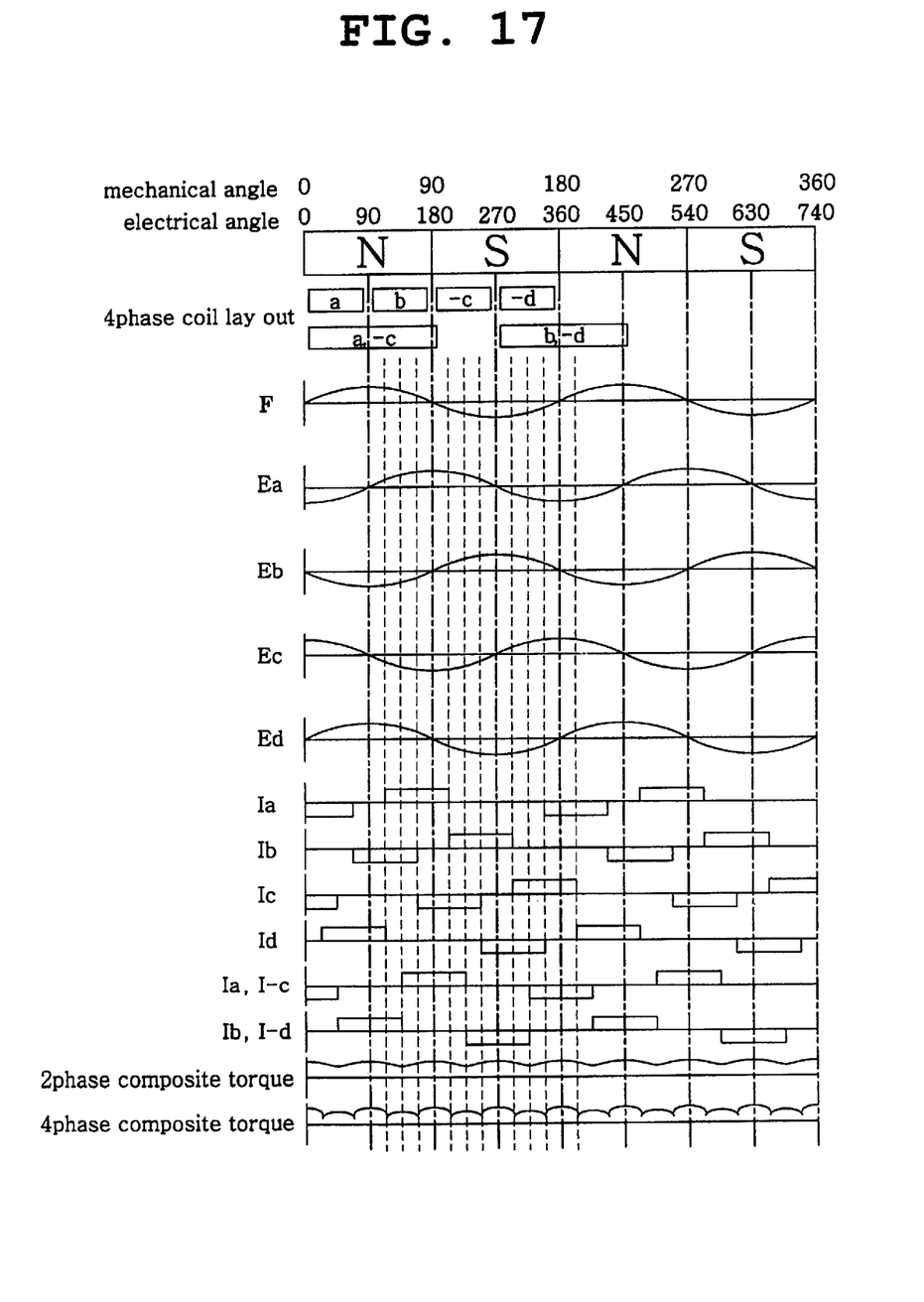
FIG. 17 is a waveform diagram illustrating a drive characteristic of the vibration motor in accordance with the present invention.

FIG. 17 is a waveform diagram illustrating a drive characteristic of the vibration motor in accordance with the present invention. As shown in this drawing, each of the armature coils 91, 92, 93 and 94 of the coil part 90 has an electrical phase difference of $\pi/2$. In the drawing, a mark "−" preceding each of the coil c and coil d indicates that each coil is wound in the opposite direction to the wound direction of the associated coil.

As apparent from the above description, according to the present invention, the four armature coils of the coil part 90 are connected commonly to the neutral point C and arranged to generate signals with periods of an electrical phase difference of $\pi/2$. Therefore, the setting of the spaced angle between the brushes 60, most difficult in conventional motor manufacturing techniques, can be performed more freely.

Also, according to this invention, the coil part 90 is merely partitioned into four coils under the condition that it has the same number of turns as those in conventional two-phase driven motors. Further, each pair of coils are duplicately wound in opposite directions. Therefore, the present vibration motor can be reduced in size while being subjected to almost the same manufacturing process as conventional two-phase driven motors.

Further, the spaced angle between the brushes 60 brought into contact with the segments of the commutator 80 can be set more freely, thereby making it simpler and more convenient to assemble the brushes 60.

Furthermore, the armature coils of the coil part 90 are connected in common to the neutral point C, resulting in the perfect removal of a nonconduction interval, typically caused in conventional two-phase driven motors, and in turn effecting the stable driving of the motor.

Therefore, the present invention provides a vibration motor capable of solving a death point of a single-phase driven motor, a nonconduction interval of a two-phase driven motor and a complex construction of a three-phase driven motor at one time. Moreover, this invention provides a novel motor by simply improving the structure of a coil. Furthermore, this invention eliminates the production of defective units resulting from a mechanical error during mass motor production. Therefore, the present invention has the effect of increasing productivity and providing a stable drivability and reliable performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flat-type vibration motor comprising:
    a lower casing part;
    an upper casing part for covering said lower casing part;
    a shaft for interconnecting said lower casing part and upper casing part at their centers;
    a lower board attached to an upper surface of said lower casing part;
    a magnet mounted on an edge of said upper surface of said lower casing part outside said lower board, said magnet being polarized with at least 2 poles;
    an upper board fitted around said shaft and unbalanced in weight;
    a commutator arranged on a lower surface of said upper board around an axis of said shaft, said commutator having segments of the number twice that of said poles of said magnet;
    a pair of brushes having their one ends fixedly connected to said lower board and their other ends brought into contact with said commutator, said brushes being spaced apart from each other at an interval of an electrical angle within the range of $\pi/2$ to $3\pi/2$; and
    coil means having a pair of armature coil assemblies formed on an upper surface of said upper board, each of said armature coil assemblies including a pair of armature coils duplicately wound and connected in common to a neutral point, said armature coils of said armature coil assemblies being sequentially conducted to have an electrical phase difference of $\pi/2$ in the order of their activation.

2. A flat-type vibration motor as set forth in claim 1, wherein said upper board has the shape of the fan that has a predetermined degree.

3. A flat-type vibration motor as set forth in claim 1, wherein each of said armature coils of said coil means has a pitch of an electrical angle of $\pi$.

4. A flat-type vibration motor as set forth in claim 1, wherein each of said armature coils of said coil means has a pitch of an electrical angle of $\pi/2$.

* * * * *